US010067709B2

(12) United States Patent
Piga et al.

(10) Patent No.: US 10,067,709 B2
(45) Date of Patent: Sep. 4, 2018

(54) PAGE MIGRATION ACCELERATION USING A TWO-LEVEL BLOOM FILTER ON HIGH BANDWIDTH MEMORY SYSTEMS

(71) Applicant: Advanced Micro Devices, Inc., Sunnyvale, CA (US)

(72) Inventors: Leonardo Piga, Austin, TX (US); Mauricio Breternitz, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 5 days.

(21) Appl. No.: 15/269,289

(22) Filed: Sep. 19, 2016

(65) Prior Publication Data

US 2018/0081585 A1    Mar. 22, 2018

(51) Int. Cl.
| | | |
|---|---|---|
| *G06F 12/00* | (2006.01) | |
| *G06F 3/06* | (2006.01) | |
| *G06F 17/30* | (2006.01) | |
| *G06F 13/00* | (2006.01) | |
| *G06F 13/28* | (2006.01) | |

(52) U.S. Cl.
CPC .......... *G06F 3/0647* (2013.01); *G06F 3/0614* (2013.01); *G06F 3/0638* (2013.01); *G06F 3/0653* (2013.01); *G06F 3/0683* (2013.01); *G06F 17/30949* (2013.01); *G06F 17/30979* (2013.01)

(58) Field of Classification Search
CPC .... G06F 3/0647; G06F 3/0614; G06F 3/0683; G06F 3/0638; G06F 3/0653; G06F 17/30979; G06F 17/30949
See application file for complete search history.

(56) References Cited

U.S. PATENT DOCUMENTS

| | | | | |
|---|---|---|---|---|
| 6,282,614 B1 * | 8/2001 | Musoll | ................... | G06F 1/3225 711/113 |
| 2009/0222625 A1 * | 9/2009 | Ghosh | ..................... | G06F 9/383 711/130 |
| 2010/0250856 A1 * | 9/2010 | Owen | ................... | G06F 12/084 711/128 |

OTHER PUBLICATIONS

Qiao et al., "Fast Bloom Filters and Their Generalization", IEEE Transactions on Parallel and Distributed Systems, Jan. 2014, pp. 93-103, vol. 25, Issue 1, IEEE Computer Society, Washington, D.C., USA.

(Continued)

*Primary Examiner* — Mark A Giardino, Jr.
(74) *Attorney, Agent, or Firm* — Meyertons Hood Kivlin Kowert and Goetzel PC; Rory D. Rankin

(57) ABSTRACT

Systems, apparatuses, and methods for accelerating page migration using a two-level bloom filter are disclosed. In one embodiment, a system includes a GPU and a CPU and a multi-level memory hierarchy. When a memory request misses in a first memory, the GPU is configured to check a first level of a two-level bloom filter to determine if a page targeted by the memory request is located in a second memory. If the first level of the two-level bloom filter indicates that the page is not in the second memory, then the GPU generates a page fault and sends the memory request to a third memory. If the first level of the two-level bloom filter indicates that the page is in the second memory, then the GPU sends the memory request to the CPU.

13 Claims, 8 Drawing Sheets

(56) References Cited

OTHER PUBLICATIONS

Breternitz et al., "A Segmented Bloom Filter Algorithm for Efficient Predictors", Proceedings of the 2008 20th International Symposium on Computer Architecture and High Performance Computing, Oct. 29, 2008, pp. 123-130, IEEE Computer Society, Washington, D.C., USA.

\* cited by examiner

PAGE MIGRATION ACCELERATION USING A TWO-LEVEL BLOOM FILTER ON HIGH BANDWIDTH MEMORY SYSTEMS

BACKGROUND

Description of the Related Art

To meet memory bandwidth, latency and capacity demands, computing systems are likely to contain multiple levels of memory. Additionally, high bandwidth memory systems are often composed of multiple classes of memory. For example, a system can include high-bandwidth, low-latency memory device(s) near the processing core(s) and larger, lower-bandwidth, and high-latency general memory device(s) further from the core(s). In another example, two virtual memory systems can be utilized in a system with a graphics processing unit (GPU) and a central processing unit (CPU). A first virtual memory system can be utilized by the GPU which is backed up by a second virtual memory system on the CPU. However, this organization incurs the cost of two searches on page tables for memory requests which miss in the first virtual memory system.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
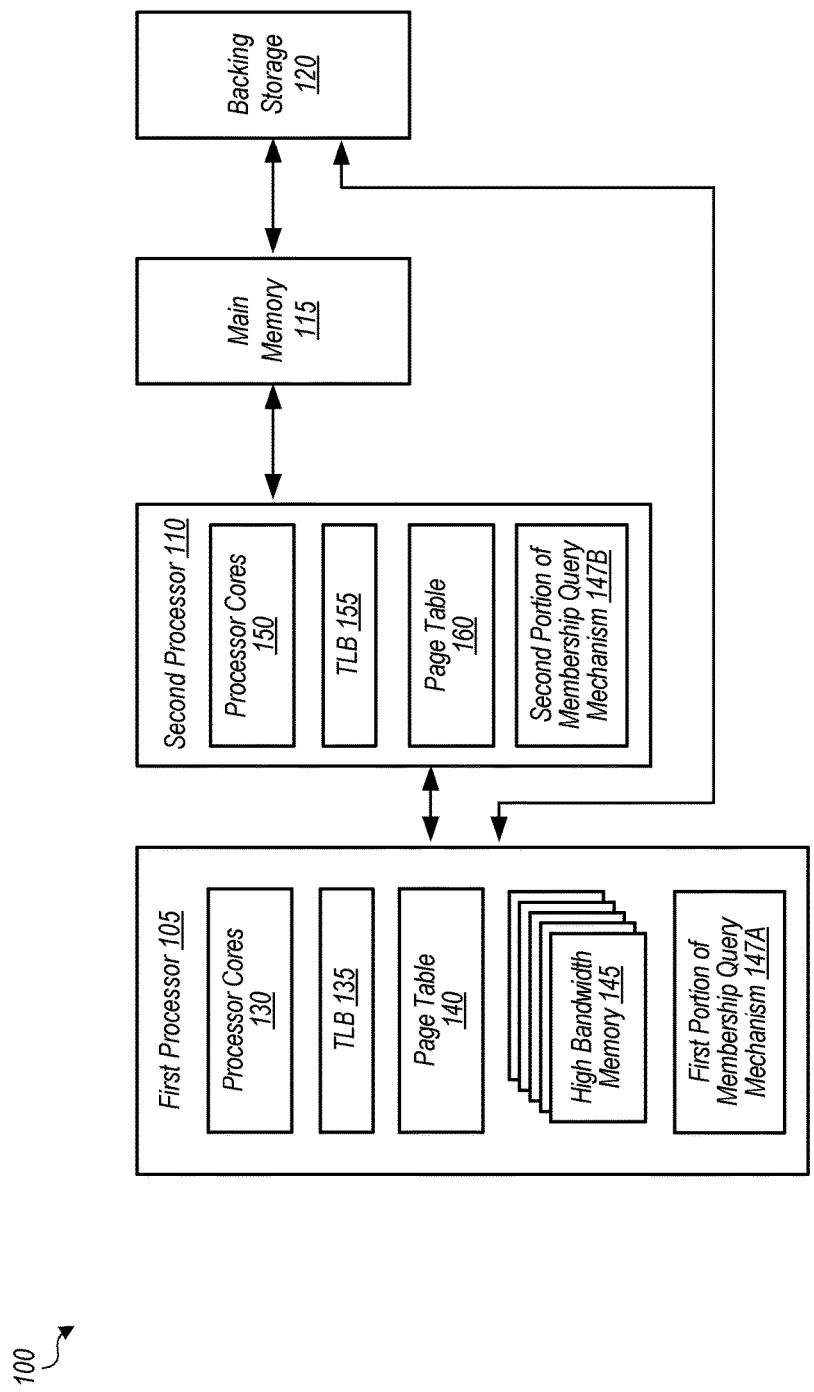
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a page migration mechanism for a multi-processor system are disclosed. In one embodiment, a system includes a GPU and a CPU. The GPU is configured to generate memory requests and check the local memory of the GPU for the memory pages targeted by the memory requests. In one embodiment, the local memory of the GPU includes high-bandwidth memory (HBM).

If the data targeted by a given memory request is not located in the local memory of the GPU, then the GPU utilizes an approximate membership query mechanism to determine if the data is stored in the physical memory of the CPU. If the membership query mechanism indicates that the memory request is not stored in the physical memory of the CPU, then the GPU generates a page fault and sends the memory request to the system backing storage. If the membership query mechanism indicates that the memory request is stored in the physical memory of the CPU, the GPU sends the request to the CPU, and then the CPU performs a lookup of the CPU physical memory. If the lookup misses in the CPU physical memory, then the CPU generates a page fault and sends the memory request to the backing storage.

In one embodiment, the membership query mechanism is a dual-level bloom filter stored in two classes of memory. A first portion of the bloom filter is stored in the GPU memory and a second portion of the bloom filter is stored in the CPU memory. A plurality of hash bits are generated to specify a plurality of bit locations in the bloom filter. A first portion of the plurality of hash bits are used to select a word within the first and second portions of the bloom filter. Then, a second portion of the plurality of hash bits are used to select individual bits within the words of the first and second portions of the bloom filter.

In one embodiment, for the GPU to determine if the data targeted by a memory request is stored in the CPU physical memory, the GPU queries the first portion of the bloom filter stored in the local memory of the GPU. If the first portion of the bloom filter indicates the memory request is stored in the physical memory of the CPU, then the GPU sends the memory request to the CPU. If the first portion of the bloom filter indicates the memory request is not stored in the physical memory of the CPU, then the GPU generates a page fault and sends the memory request to the backing storage.

In one embodiment, when the GPU forwards the memory request to the CPU, the CPU checks the second portion of the bloom filter. If the second portion of the bloom filter indicates the memory request is stored in the physical memory of the CPU, then the CPU retrieves the targeted data and returns the data to the GPU. If the second portion of the bloom filter indicates the memory request is not stored in the physical memory of the CPU, then the CPU generates a page fault and sends the memory request to the backing storage.

Referring now to FIG. 1, a block diagram of one embodiment of a computing system 100 is shown. Computing system 100 includes first processor 105, second processor 110, main memory 115, and backing storage 120. Computing system 100 can also include other components (e.g., bridge, input/output devices, memory controller) which are not shown in FIG. 1 to avoid obscuring the figure. In one embodiment, first processor 105 is a graphics processing unit (GPU) and second processor 110 is a central processing unit (CPU). In other embodiments, first processor 105 and/or second processor 110 can be other types of processors. In one embodiment, first processor 105 and second processor 110 are combined together within an accelerated processing unit (APU).

In one embodiment, first processor 105 and second processor 110 share the entire virtual address space of system 100. In this embodiment, a virtual address mapped to a physical address using page table 140 will map to the same physical address using page table 160. In another embodiment, first processor 105 and second processor 110 share a portion of the entire virtual address space of system 100. In this embodiment, only some virtual addresses will map to the same physical address when using either page table 140 or page table 160.

In one embodiment, first processor 105 includes processor cores 130, translation lookaside buffer (TLB) 135, page table 140, high bandwidth memory (HBM) 145, and first portion of membership query mechanism 147A. Processor cores 130 can include any number and type of processing units, with the number and type varying depending on the embodiment. TLB 135 stores frequently used virtual-to-physical address translations from page table 140. In one embodiment, second processor 110 includes processor cores 150, TLB 155, page table 160, and second portion of membership query mechanism 147B. Processor cores 150 can include any number and type of processing units. TLB 155 stores frequently used virtual-to-physical address translations from page table 160. It is noted that first processor 105 and/or second processor 110 can include other components (e.g., L1 cache, L2 cache) not shown in FIG. 1 to avoid obscuring the figure. For example, although not explicitly shown in FIG. 1, system 100 can include one or more cache memories that are internal to the processor cores of first processor 105 and/or second processor 110. In some embodiments, system 100 can include shared caches that are utilized by both first processor 105 and second processor 110. Any of these caches can be part of a cache subsystem including a cache controller.

In one embodiment, main memory 115 and HBM 145 are implemented using dynamic random-access memory (DRAM) devices. The type of DRAM that is used includes (but is not limited to) double data rate (DDR) DRAM, DDR2 DRAM, DDR3 DRAM, and so forth. In other embodiments, main memory 115 and HBM 145 can be implemented using other types of memory devices. In one embodiment, main memory 115 is utilized as the system memory for system 100. In another embodiment, the combination of main memory 115 and HBM 145 is utilized as the system memory for system 100. The term "system memory" or "main system memory" is used herein to refer to one or more physical memory components which are used to implement all or part of a system's main memory address space. The term system memory is therefore distinguished from "cache memory", which does not implement the main memory address space, but rather stores local copies of data stored in a system memory.

In one embodiment, system 100 includes membership query mechanism 147A-B for determining if a memory page targeted by a memory request is located in the physical memory (i.e., main memory 115) of second processor 110. It should be understood that the terms "memory page" and "page" are intended to represent any size of memory region. In one embodiment, membership query mechanism 147A-B is a two-level bloom filter. In other embodiments, membership query mechanism 147A-B can be other types of mechanisms. In one embodiment, membership query mechanism 147A is stored in first processor 105 and membership query mechanism 147B is stored in second processor 110. Alternatively, in another embodiment, second portion of membership query mechanism 147B is stored in main memory 115. In one embodiment, membership query mechanism 147A is stored in high bandwidth memory 145.

In one embodiment, first processor 105 utilizes membership query mechanism 147A for determining if data targeted by a memory request is located in main memory 115. If the memory request misses in HBM 145, then first processor 105 queries the membership query mechanism 147A for the page targeted by the memory request. If the membership query mechanism indicates that the page is not stored in main memory 115, then first processor 105 generates a page fault and sends the memory request to backing storage 120. In one embodiment, the term "page fault" is defined as an event when an instruction targets a memory page that is mapped into the virtual address space but the memory page is not loaded in system memory.

If the first portion of membership query mechanism 147A indicates that the page might be stored in main memory 115, then first processor 105 sends the memory request to second processor 110. When second processor 110 receives the memory request, second processor 110 perform a lookup of the second portion of membership query mechanism 147B for the memory request. If the second portion of membership query mechanism 147B indicates the page targeted by the memory request is not stored in main memory 115, then second processor 110 generates a page fault and sends the memory request to backing storage 120. If the second portion of membership query mechanism 147B indicates the data of the memory request might be stored in the main memory 115, then second processor 110 performs a lookup of main memory 115. If the page targeted by the memory request is stored in main memory 115, then second processor 110 returns the page to first processor 105. If the page targeted by the memory request is not stored in main memory 115, then second processor 110 generates a page fault and sends the memory request to backing storage 120. When second processor 110 generates a page fault and sends the memory request to backing storage 120, the data of the memory request is migrated from backing storage 120 to main memory 115.

In one embodiment, backing storage 120 is implemented using a non-volatile memory device (e.g., hard disk drive, solid state drive, non-volatile random-access memory (NVRAM)). In various embodiments, computing system 100 can be a computer, laptop, mobile device, server, web server, cloud computing server, storage system, or any of various other types of computing systems or devices. It is noted that the number of components of computing system 100 can vary from embodiment to embodiment. There can be more or fewer of each component/subcomponent than the number shown in FIG. 1. It is also noted that computing system 100 can include other components not shown in FIG. 1. Additionally, in other embodiments, computing system 100 can be structured in other ways than shown in FIG. 1.

Figure 2:
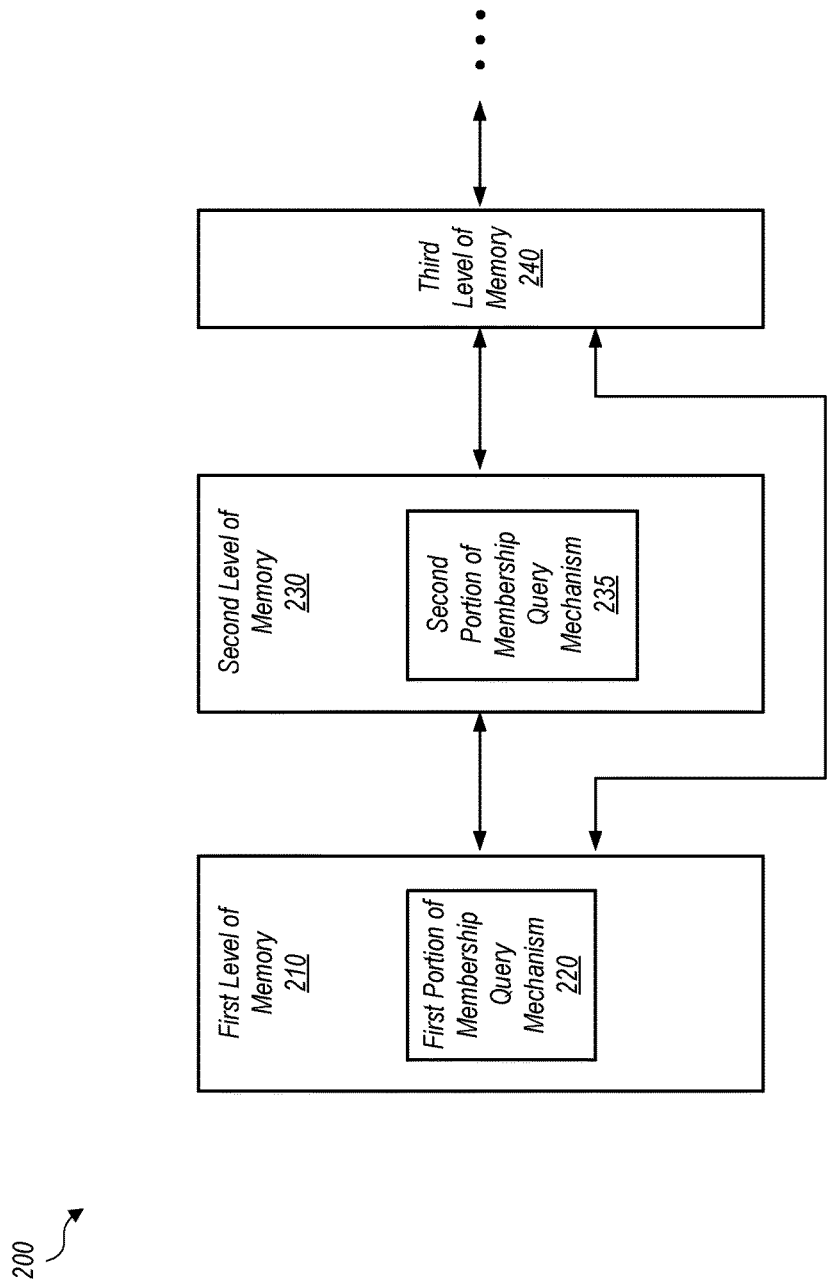
FIG. 2 is a block diagram of one embodiment of a multi-level memory hierarchy.

Turning now to FIG. 2, a block diagram of one embodiment of a multi-level memory hierarchy 200 is shown. Multi-level memory hierarchy 200 includes first level of memory 210, second level of memory 230, and third level of memory 240. In other embodiments, multi-level memory hierarchy 200 can have other numbers of memory levels. Depending on the embodiment, each level of memory can be a cache or other type of memory device. Each level of memory can also have a processing unit included as part of the memory and/or each level of memory can be coupled to a processing unit. For example, in one embodiment, first level of memory 210 is included within a GPU and second level of memory 230 is coupled to a CPU.

In one embodiment, first level of memory 210 stores first portion of membership query mechanism 220 and second level of memory 230 stores second portion of membership query mechanism 235. In one embodiment, first portion of membership query mechanism 220 and second portion of membership query mechanism 235 are separate portions of a two-level bloom filter. When a memory request misses in first level of memory 210, a lookup is performed of first portion of membership query mechanism 220 to determine if the page targeted by the memory request resides in second level of memory 230. If first portion of membership query mechanism 220 indicates the page targeted by the memory request resides in second level of memory 230, then the memory request is sent to second level of memory 230 and a lookup is performed of second portion of membership query mechanism 235. If first portion of membership query mechanism 220 indicates the page targeted by the memory request is not stored in second level of memory 230, then the memory request bypasses second level of memory 230 and is sent directly to third level of memory 240. The page can then be migrated from third level of memory 240 to first level of memory 210.

Figure 3:
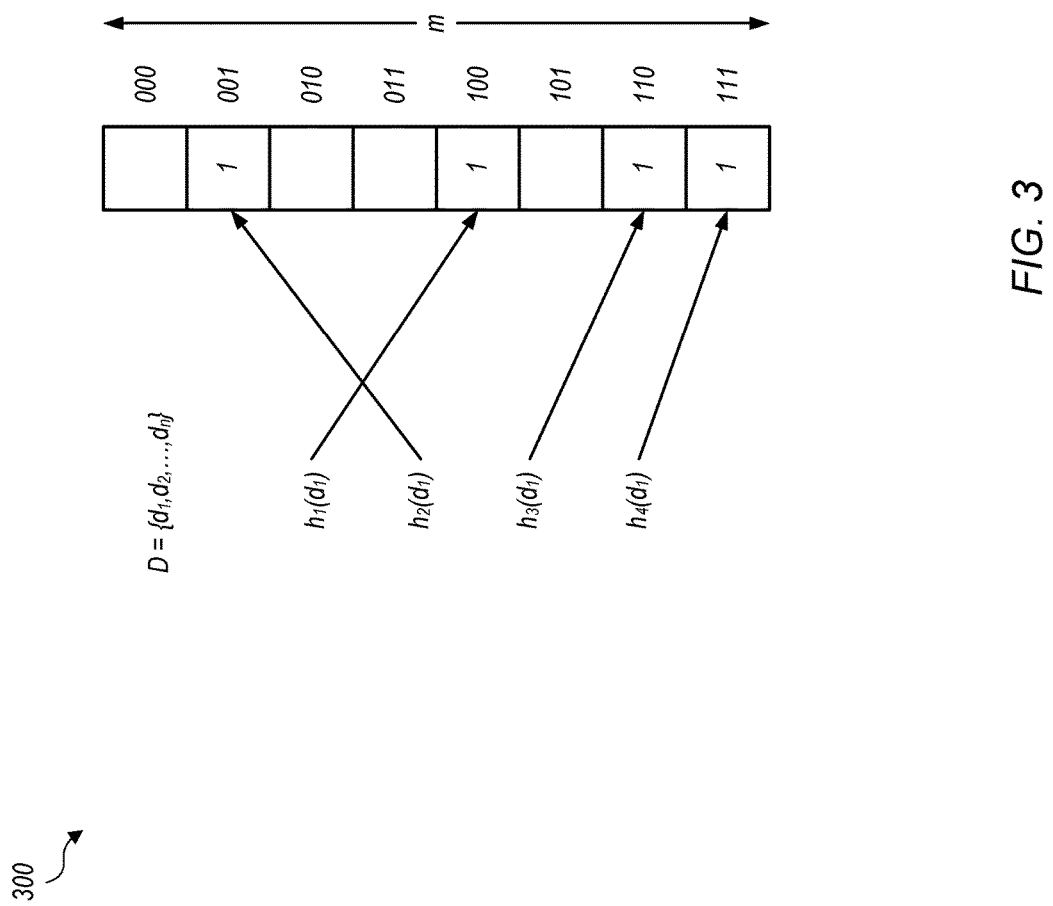
FIG. 3 is a block diagram of one embodiment of a bloom filter mechanism.

Referring now to FIG. 3, a block diagram of one embodiment of a bloom filter mechanism 300 is shown. A bloom filter is an efficient algorithm to implement membership queries. The bloom filter includes an array of "m" bits which are initialized to zeros. In one embodiment, the bloom filter is populated with the identifiers of pages that are present in the CPU virtual memory and allocated in the CPU physical memory space.

Bloom filters are susceptible to "false positive" answers such that a page can be indicated as present when it is not. However, when the bloom filter indicates the absence of a page, that information is precise. The bloom filter can accelerate the case of a page miss on the GPU by avoiding a search of the page tables on the CPU. In such a case, instead of delegating the miss to the CPU memory system, the GPU queries the bloom filter first to ensure that the page is on the CPU before disturbing the memory system of the CPU. In the case of a negative response from the bloom filter, the GPU can generate the page fault directly, which avoids the overhead of going to the CPU memory system. In the case of a positive response from the bloom filter, the GPU passes the address to the CPU to handle the request. When the CPU needs to migrate a page to the backing storage, the CPU can reset and recreate the bloom filter entries. This represents a small overhead as page walking is also performed at this time.

In one embodiment, a dataset "D" of N data elements "$d_1, d_2, \ldots, d_n$" is stored in a given memory space spanning one or more storage devices (not shown). When a data element becomes a member of the dataset "D" (i.e., the data element is stored in the given memory space), then the bloom filter mechanism 300 is updated to indicate the presence of the new data element. For example, in one embodiment, in order to update the bloom filter mechanism 300, a plurality of hash functions (e.g., $h_1, h_2, h_3, h_4$) are applied to the data element to determine locations within the "m" locations of the bloom filter. As shown in FIG. 3, there are four hash functions, with each hash function generating three hash bits to identify one of the eight bit locations within the bloom filter. This is shown merely as one possible implementation of a bloom filter. Other implementations of bloom filters can utilize other numbers of hash functions, other numbers of hash bits for each hash function, and other numbers of locations within the bloom filter.

To update the bloom filter to indicate the existence of the new data element $d_1$, each hash function is applied to the new data element $d_1$. For example, $h_1$ is applied to the data element $d_1$, $h_2$ is applied to the data element $d_1$, $h_3$ is applied to the data element $d_1$, and $h_4$ is applied to the data element $d_1$. This will generate four locations within the bloom filter. Each of these bit locations is then set to "1". One or more of these bit locations could already have been set to "1", in which case the bit will remain set to "1".

To determine if a given data element is stored in the dataset "D", each of the hash functions is applied to the given data element to identify four locations within the bloom filter. If each of the bits at these identified locations is equal to "1", then this indicates the likely presence of the given data element in the dataset. On the other hand, if a bit at any of the identified locations is set to "0", then this indicates that the given data element is not stored in the dataset.

Figure 4:
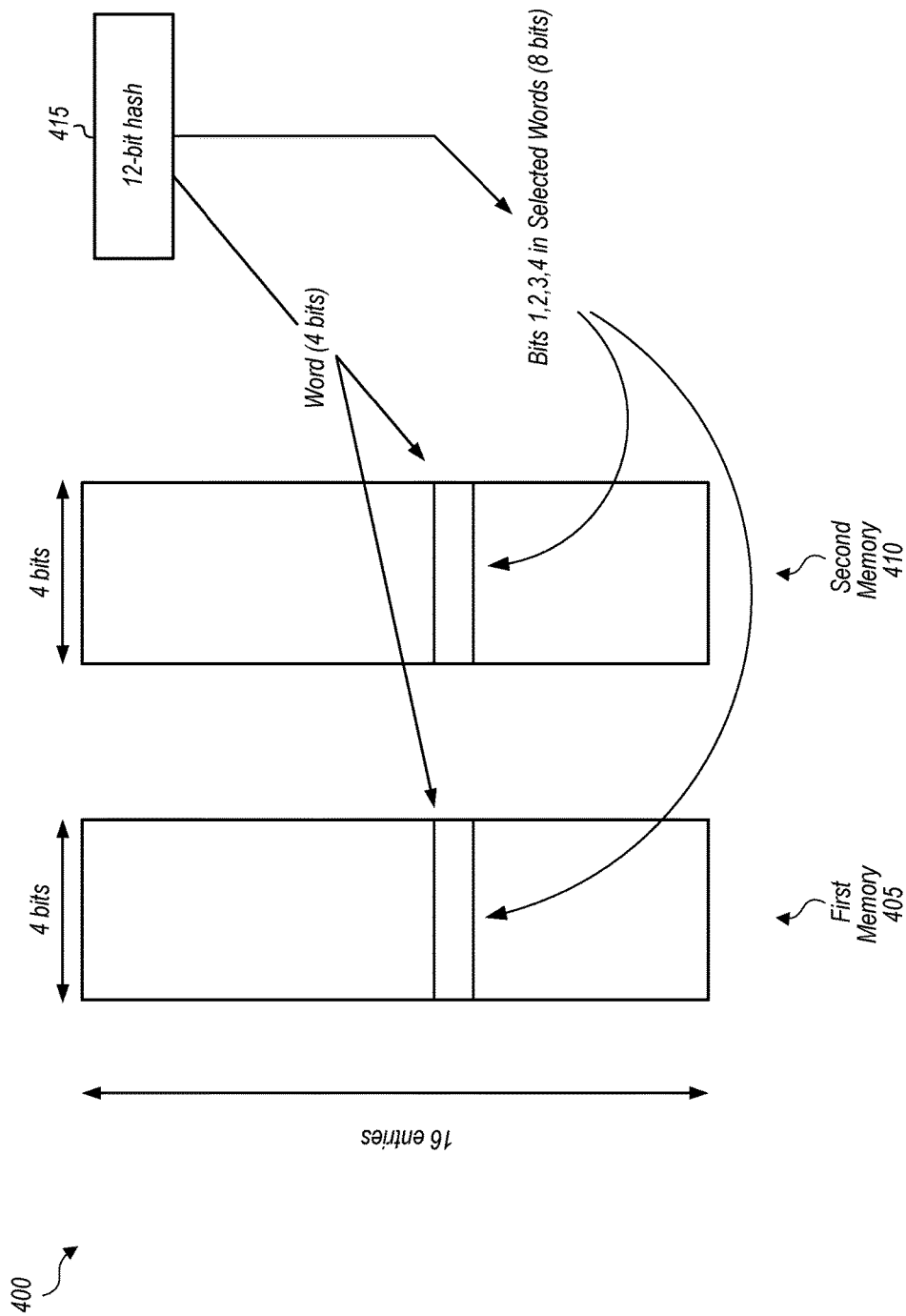
FIG. 4 is a block diagram of one embodiment of a two-level bloom filter implementation.

Turning now to FIG. 4, a block diagram of one embodiment of a two-level bloom filter implementation 400 is shown. In one embodiment, a bloom filter is implemented by separating the filter into two portions. In one embodiment, a subset of the bits required for a membership query are allocated in a memory space reserved on the GPU's HBM. A potential presence on the Bloom filter would require all bits referenced in a query to be set to "1". If any of the bits which are queried on the HBM portion of the filter are "0", then the step of checking the remainder of the Bloom filter can be skipped.

In one embodiment, as shown in FIG. 4, bloom filter 400 is split into two levels, with a first portion of bloom filter 400 stored in first memory 405 and a second portion of bloom filter 400 in second memory 410. For example, in one embodiment, first memory 405 can be in a first processor (e.g., first processor 105 of FIG. 1) and second memory 410 can be the physical memory of a second processor (e.g., second processor 110).

To determine if a data element is stored in a given memory space, or to store an indication in the bloom filter that a data element has been added to the dataset, one or more hash functions can be used to generate multiple hash bits from the data element. Hash bits 415 are representative of one embodiment of the hash bits that can be generated using the one or more hash functions. In one embodiment, hash bits 415 include 12 hash bits. In other embodiments, hash bits 415 can include other numbers of bits.

In one embodiment, a first portion of hash bits 415 is used to select a word in first memory 405 and a word in second memory 410. As used herein, the term "word" is defined as a contiguous block of bits that can be fetched from memory in a single access. Then, a second portion of hash bits 415 is used to select which bits in the selected words to read to determine if the data element is a member of the dataset or to set to indicate the data element has been added to the dataset. In the embodiment shown in FIG. 4, four bits of hash bits 415 are used to select a word in first memory 405 and a word in second memory 410, and eight bits of hash bits 415 are used to select which bits in these words. In other embodiments, the first portion of hash bits 415 and the second portion of hash bits 415 can include other numbers of bits.

Figure 5:
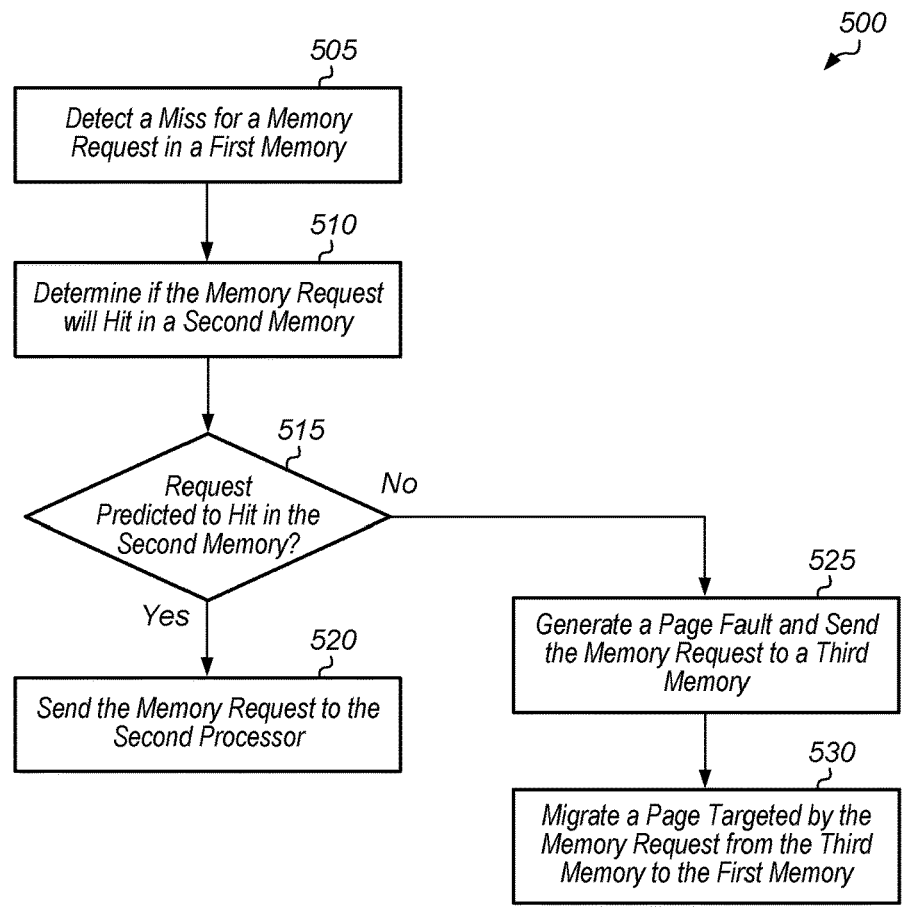
FIG. 5 is a generalized flow diagram illustrating one embodiment of a method for processing memory requests.
Figure 6:
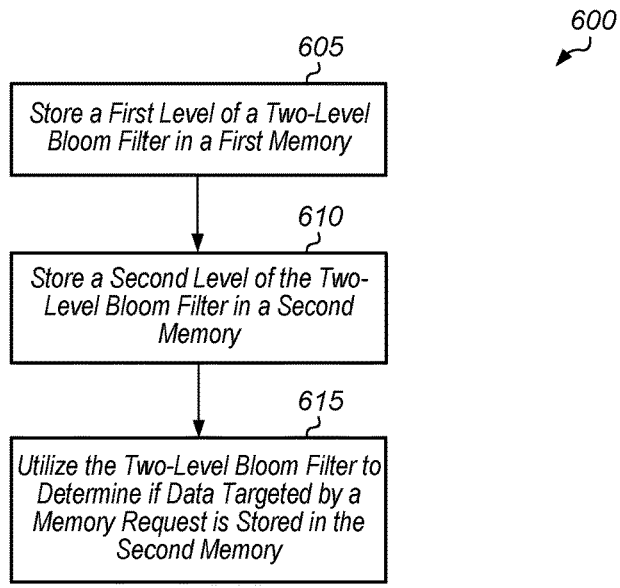
FIG. 6 is a generalized flow diagram illustrating one embodiment of a method for utilizing a membership query mechanism.
Figure 7:
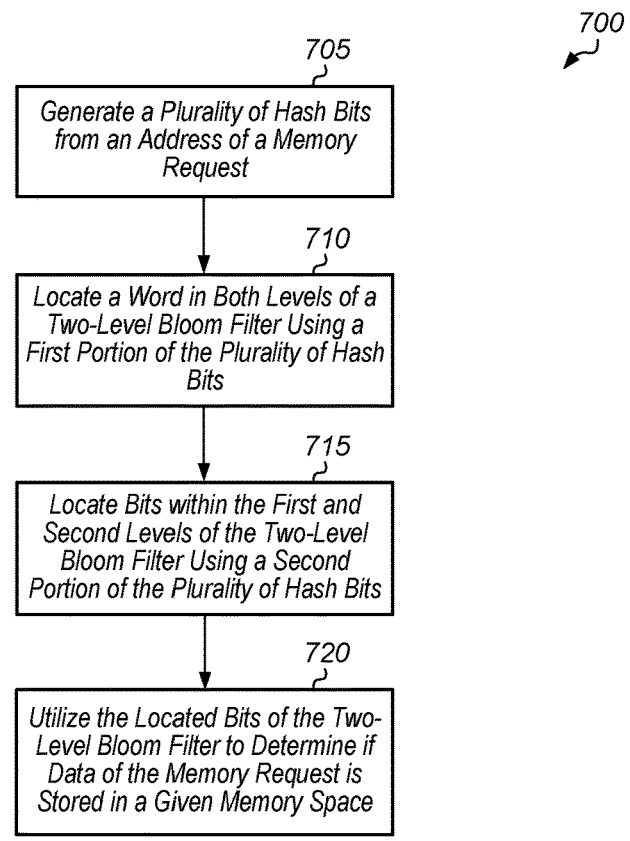
FIG. 7 is a generalized flow diagram illustrating one embodiment of a method for accessing a membership query mechanism.
Figure 8:
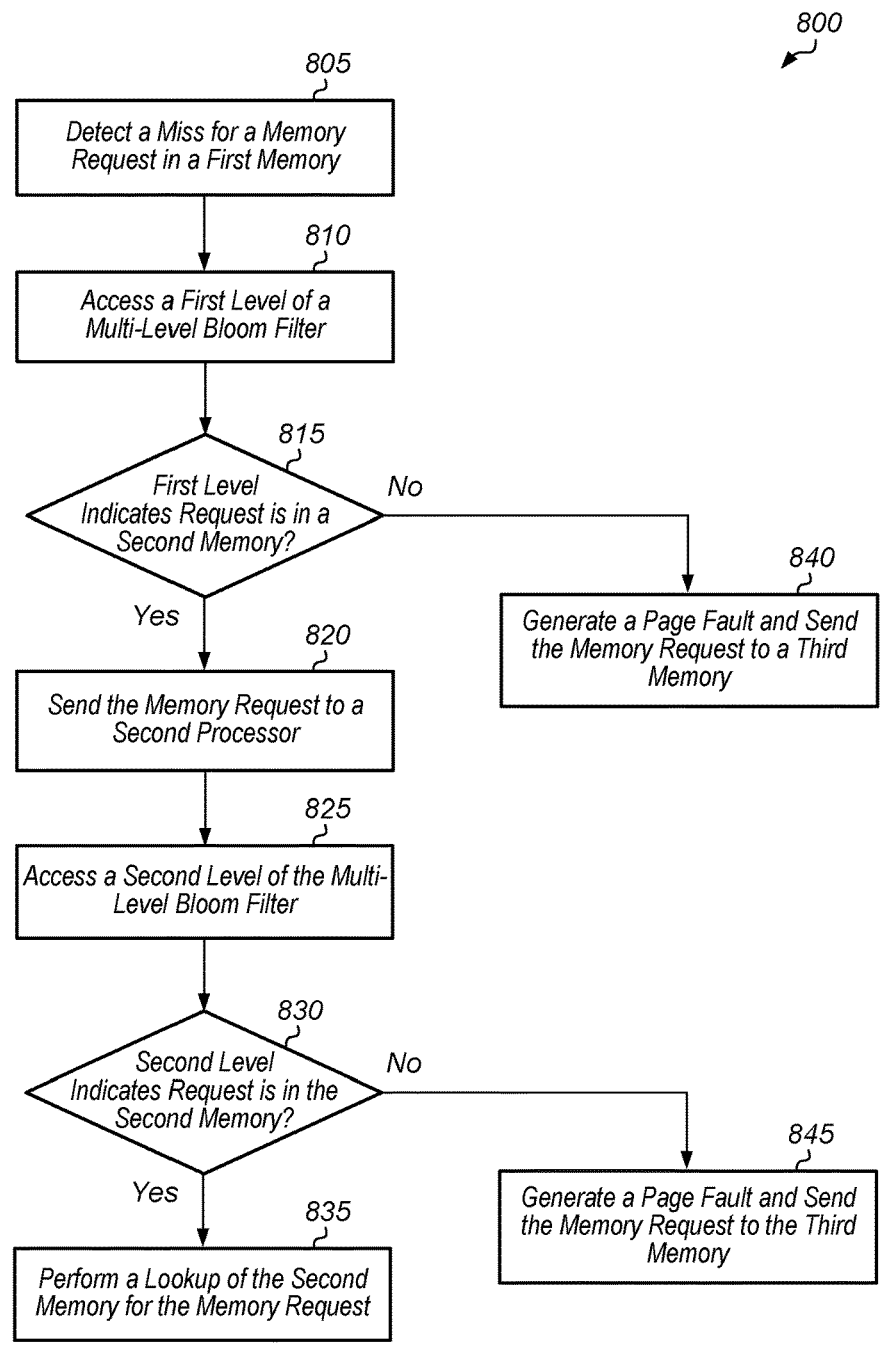
FIG. 8 is a generalized flow diagram illustrating one embodiment of a method for processing a memory request.

Referring now to FIG. 5, one embodiment of a method 500 for processing memory requests is shown. For purposes of discussion, the steps in this embodiment and those of FIGS. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A first processor detects a miss for a memory request in a first memory (block 505). In one embodiment, the first processor is part of a system with multiple processors and a multi-level memory hierarchy which includes multiple separate memory spaces. In one embodiment, the first processor is a GPU and the first memory is a high bandwidth memory (HBM). Next, the first processor determines if the memory request will hit in a second memory (block 510). In one embodiment, the first processor determines if the memory request will hit in a second memory by checking a membership query mechanism. In one embodiment, the membership query mechanism is a two-level bloom filter, with a first portion of the bloom filter stored in the first memory and a second portion of the bloom filter stored in the second memory. In one embodiment, the first processor checks the first level of the bloom filter in block 510 of method 500.

If the memory request is predicted to hit in the second memory of the second processor (conditional block 515, "yes" leg), then the first processor sends the memory request to the second processor (block 520). If the memory request is predicted to miss in the second memory of the second processor (conditional block 515, "no" leg), then the first processor generates a page fault and sends the memory request to a third memory (block 525). Next, the page targeted by the memory request is migrated from the third memory to the first memory (block 530). After blocks 520 and 530, method 500 ends.

Turning now to FIG. 6, one embodiment of a method 600 for utilizing a membership query mechanism is shown. In the example shown, a system is configured to store a first level of a two-level bloom filter in a first memory (block 605). In one embodiment, the first memory is a high bandwidth memory (HBM) included as part of a GPU. In other embodiments, the first memory can be other types of memory devices and/or included in other components within the system. Next, the system stores a second level of the two-level bloom filter in a second memory (block 610). In one embodiment, the second memory is a physical memory of a CPU. In other embodiments, the second memory can be any of various other types of memories or memory spaces within the system. Then, the system utilizes the two-level bloom filter to determine if data targeted by a memory request is stored in the second memory (block 615). In one embodiment, a first processor performs a lookup of the first level of the two-level bloom filter to determine if data targeted by a memory request is stored in the second memory. In this embodiment, if the lookup of the first level of the two-level bloom filter indicates that the data might be stored in the second memory, then a second processor performs a lookup of the second level of the two-level bloom filter to determine if data targeted by a memory request is stored in the second memory. After block 615, method 600 ends.

Referring now to FIG. 7, one embodiment of a method 700 for accessing a membership query mechanism is shown. In the example shown, a system is configured to generate a plurality of hash bits from an address of a memory request (block 705). A first portion of the plurality of hash bits are utilized to locate a word in both levels of a two-level bloom filter (block 710). Also, a second portion of the plurality of hash bits are utilized to locate bits within the words of the first and second levels of the two-level bloom filter (block 715). The located bits of the two levels of the bloom filter are then utilized to determine if data of the memory request is stored in a given memory space (block 720). After block 720, method 700 ends.

Turning now to FIG. 8, one embodiment of a method 800 for processing a memory request is shown. In the example shown, a first processor detects a miss for a memory request in a first memory (block 805). In response to detecting the miss for the memory request in the first memory, the first processor accesses a first level of a multi-level bloom filter (block 810). In one embodiment, the multi-level bloom filter has two levels. In other embodiments, the multi-level bloom filter has three levels, four levels, or any other number of levels.

If the first level of the multi-level bloom filter indicates that the memory request is in a second memory (conditional block 815, "yes" leg), then the first processor sends the memory request to a second processor (block 820). Next, the second processor accesses a second level of the multi-level bloom filter (block 825). In one embodiment, the second level of the multi-level bloom filter is stored in the second memory. If the second level of the multi-level bloom filter indicates that the memory request is in the second memory (conditional block 830, "yes" leg), then the second processor performs a lookup of the second memory for the memory request (block 835).

If the first level of the multi-level bloom filter indicates that the memory request is not in the second memory (conditional block 815, "no" leg), then the first processor generates a page fault and sends the memory request to a third memory (block 840). If the second level of the multi-level bloom filter indicates that the memory request is not in the second memory (conditional block 830, "no" leg), then the second processor generates a page fault and sends the memory request to the third memory (block 845). After blocks 835, 840, and 845, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a plurality of processors; and
   a multi-level memory hierarchy;
   wherein a first processor of the plurality of processors is configured to:
      detect a miss for a memory request in a first memory; and
      utilize a membership query mechanism for determining if data targeted by the memory request is stored in a second memory;
   wherein:
      the membership query mechanism is a two-level bloom filter;
      a plurality of hash bits are generated for an address of the memory request;
      a first portion of the plurality of hash bits are used to select a word within the first and second portions of the bloom filter; and a second portion of the plurality of hash bits are used to select individual bits within the selected words of the first and second portions of the bloom filter;
wherein the system is configured to:
store the first portion of the membership query mechanism in the first memory; and
store the second portion of the membership query mechanism in the second memory.

2. The system as recited in claim 1, wherein the first processor is further configured to:
send the memory request to a second processor of the plurality of processors responsive to detecting an indication that the data targeted by the memory request is stored in a second memory; and
generate a page fault and send the memory request to a third memory responsive to detecting an indication that the data targeted by the memory request is not stored in the second memory.

3. The system as recited in claim 1, wherein the first processor is a graphics processing unit (GPU), and wherein the second processor is a central processing unit (CPU).

4. The system as recited in claim 1, wherein the second processor is configured to:
receive the memory request from the first processor;
perform a lookup of the second memory for the memory request;
generate a page fault and send the memory request to the third memory responsive to a lookup for the memory request missing in the second memory; and
return a page targeted by the memory request to the first memory responsive to the memory request hitting in the second memory.

5. The system as recited in claim 1, wherein a page targeted by the memory request is migrated from the third memory to the first memory.

6. A method comprising:
detecting, by a first processor, a miss for a memory request in a first memory; and
utilizing a membership query mechanism for determining if data targeted by the memory request is stored in a second memory;
wherein:
the membership query mechanism is a two-level bloom filter;
a plurality of hash bits are generated for an address of the memory request;
a first portion of the plurality of hash bits are used to select a word within the first and second portions of the bloom filter; and
a second portion of the plurality of hash bits are used to select individual bits within the selected words of the first and second portions of the bloom filter;
storing the first portion of the membership query mechanism in the first memory; and
storing the second portion of the membership query mechanism in the second memory.

7. The method as recited in claim 6, further comprising:
sending the memory request to a second processor responsive to detecting an indication that the data targeted by the memory request is stored in a second memory; and
generating a page fault and sending the memory request to a third memory responsive to detecting an indication that the data targeted by the memory request is not stored in the second memory.

8. The method as recited in claim 6, wherein the first processor is a graphics processing unit (GPU), and wherein the second processor is a central processing unit (CPU).

9. The method as recited in claim 6, further comprising:
receiving the memory request from the first processor;
performing a lookup of the second memory for the memory request;
generating a page fault and sending the memory request to the third memory responsive to a lookup for the memory request missing in the second memory; and
returning a page targeted by the memory request to the first memory responsive to the memory request hitting in the second memory.

10. The method as recited in claim 6, further comprising migrating a page targeted by the memory request from the third memory to the first memory.

11. A non-transitory computer readable storage medium storing program instructions, wherein the program instructions are executable by a first processor to:
detect a miss for a memory request in a first memory; and
utilize a membership query mechanism for determining if data targeted by the memory request is stored in a second memory;
wherein:
the membership query mechanism is a two-level bloom filter;
a plurality of hash bits are generated for an address of the memory request;
a first portion of the plurality of hash bits are used to select a word within the first and second portions of the bloom filter; and
a second portion of the plurality of hash bits are used to select individual bits within the selected words of the first and second portions of the bloom filter;
wherein the program instructions are further executable by the first processor to store the first portion of the membership query mechanism in the first memory; and
wherein the program instructions are further executable by the second processor to store a second portion of the membership query mechanism in the second memory.

12. The non-transitory computer readable storage medium as recited in claim 11, wherein the program instructions are further executable by the first processor to:
send the memory request to a second processor responsive to detecting an indication that the data targeted by the memory request is stored in a second memory; and
generate a page fault and send the memory request to a third memory responsive to detecting an indication that the data targeted by the memory request is not stored in the second memory.

13. The non-transitory computer readable storage medium as recited in claim 11,
wherein the program instructions are further executable by the second processor to:
receive the memory request from the first processor;
perform a lookup of the second memory for the memory request;
generate a page fault and send the memory request to the third memory responsive to a lookup for the memory request missing in the second memory; and
return a page targeted by the memory request to the first memory responsive to the memory request hitting in the second memory.

* * * * *